(12) United States Patent
Lin et al.

(10) Patent No.: US 8,716,642 B2
(45) Date of Patent: May 6, 2014

(54) METHOD AND DEVICE FOR AUTOMATIC COMPENSATION OF SOLAR SUNLIGHT TRACING PANEL INCLINATION

(75) Inventors: Szu-Hung Lin, Hsinchu (TW); Szu-Hai Lin, Hsinchu (JP)

(73) Assignee: Wei Sheng Investment & Development Co., Ltd., Taipei (TW)

( * ) Notice: Subject to any disclaimer, the term of this patent is extended or adjusted under 35 U.S.C. 154(b) by 279 days.

(21) Appl. No.: 13/496,492

(22) PCT Filed: Aug. 6, 2010

(86) PCT No.: PCT/CN2010/001199
§ 371 (c)(1),
(2), (4) Date: Mar. 16, 2012

(87) PCT Pub. No.: WO2012/009834
PCT Pub. Date: Jan. 26, 2012

(65) Prior Publication Data
US 2012/0174964 A1     Jul. 12, 2012

(30) Foreign Application Priority Data
Jul. 20, 2010   (CN) .......................... 2010 1 0231173

(51) Int. Cl.
| | |
|---|---|
| *G01C 21/02* | (2006.01) |
| *G01C 21/24* | (2006.01) |
| *G01J 1/20* | (2006.01) |
| *F24J 2/38* | (2014.01) |
| *G01S 3/786* | (2006.01) |

(52) U.S. Cl.
CPC . *F24J 2/38* (2013.01); *G01S 3/7861* (2013.01)
USPC ....................................................... 250/203.4

(58) Field of Classification Search
CPC .................. F24J 2/00; F24J 2/38; F24J 2/40; F24J 2002/38; G01S 3/7861; G01S 3/786
USPC ................................ 250/203.1, 203.2, 203.3
See application file for complete search history.

(56) References Cited

U.S. PATENT DOCUMENTS

| | | | | |
|---|---|---|---|---|
| 2010/0102202 | A1* | 4/2010 | Sherman | 250/203.4 |
| 2011/0193515 | A1* | 8/2011 | Wu et al. | 320/101 |

FOREIGN PATENT DOCUMENTS

TW      M317554 U      8/2007

\* cited by examiner

*Primary Examiner* — Francis M Legass, Jr.
(74) *Attorney, Agent, or Firm* — Chun-Ming Shih (57) ABSTRACT

The present invention provides a method and a device for automatic inclination compensation of solar sunlight tracing panel. The device includes a plurality of solar panels adjacent to each other and capable of swinging towards sun. Two or more light sensors are separately installed on the light receiving end surface to be illuminated by sunlight and to generate electric potential signals. When comparing the electric potential signals and there is potential difference, the solar panels are driven to synchronically swing until the electric potential of the electric potential signal become the same. Thus the solar plane inclination is compensated and the whole light receiving end is illuminated by sun.

9 Claims, 10 Drawing Sheets

METHOD AND DEVICE FOR AUTOMATIC COMPENSATION OF SOLAR SUNLIGHT TRACING PANEL INCLINATION

BACKGROUND

1. Technical Field

The present invention relates to a sunlight tracing solar panel. More particularly, the present invention relates to a method for automatic compensation of inclination in order to control the solar panel to swing to a position where the whole panel is capable of being illuminated by sunlight, and the present invention also relates to a related device including a driving unit, a light sensor and a controlling unit.

2. Related Art

The Taiwanese patent application M317554 disclosed a traditional sunlight tracing solar panel capable of swinging automatically according to the sunlight illumination angle. Mainly, the solar panel was installed at the top of a bracket capable of swinging. A driving unit was installed on the side of the bracket. When the controlling unit determined the illumination angle for that season and that time, the driving unit drove the solar panel to swing with the bracket in order for the light receiving end surface of the solar panel to obtain the best illumination angle.

In addition, the traditional sunlight tracing solar panel mentioned above can include either a single set of solar panel to generate electricity or a plurality of solar panels installed adjacent to each other to generate electricity, which was disclosed in Taiwanese patent application M379172. Mainly, a linking rod was pivotally connected to all solar panels for synchronously driving all solar panels to swing towards the sun.

Furthermore, when a plurality of solar panels is installed to simultaneously generate electricity, those solar panels are usually connected in series and the solar cells which form solar panels are also connected in series. Therefore, when the whole light receiving end surface of the solar panels is illuminated by the sunlight, solar cells can respectively generate electricity and the series circuit can be conducted to output electricity.

However, when a plurality of solar panels synchronously swings towards the sunlight, one raised end of one titled solar panel may cover one lowered end of another solar panel and may form a shadow area in the light receiving end surface of that solar panel. The solar cell in the shadow area may stop generating electricity and the related series circuit may become open. As a result, the solar panel temporarily stops generating electricity and it can only be activated when its whole light receiving end surface is illuminated by sunlight However, the technologies mentioned above did not disclose the method for avoiding the shadow area which results in temporarily electricity termination. This issue needs to be solved.

BRIEF SUMMARY

The present invention has the purpose for solving the issue that the solar panel prevent sunlight from illuminating the adjacent solar panel, resulting in the adjacent solar being an open circuit and causing temporarily electricity termination.

To achieve the purpose, the present invention provides a method for automatic inclination compensation of solar sunlight tracing panel, comprising the steps of: using at least two light sensors of a light receiving end surface of the solar panel for being illuminated by sunlight and generating matching electric potential signals; and comparing the matching electric potential signals and when the electric potential signals have electric potential difference, driving the solar panels synchronically until the electric potential of the electric potential signals become equal in order for compensating the solar panel inclination to let the whole light receiving end surface illuminated by sunlight.

As mentioned above, light sensors continuously detect and generate matching electric potential signal. Controlling unit compares the electric potential signals to determine when the driving unit needs to be used to drive the solar panel for compensation swing. As a result, solar panels are capable of real-time swing compensation of inclination in order for the whole light receiving end surface to be illuminated by sunlight. The shadow area of light receiving end surface of adjacent solar panel, which is formed when the solar panel covers the sunlight, is eliminated. Therefore, the issue that solar panels temporarily stop generating the electricity is solved and the electricity generating efficiency of solar panels is increased.

The light receiving end surface includes light receiving surface of the panel or a particular position, adjacent and parallel to the light receiving surface, capable of swinging with the panel.

The method further comprises the step of dividing a daylight area into a predetermined time range for high sunlight illumination and a predetermined time range for low sunlight illumination, and comparing the electric potential signals in the time range for low sunlight illumination.

The method further comprises the step of dividing a daylight area into a predetermined time range for high sunlight illumination and a predetermined time range for low sunlight illumination, and comparing the electric potential signals in the time range for high sunlight illumination.

At least two light sensors of the light receiving end surface have related position, the related position enables the at least two light sensors situated on two adjacent sides of one end of a swinging axis of the solar panel.

At least two light sensors of the light receiving end surface include related position, the related position enables the at least two light sensors situated on two end sides of the light receiving end surface.

At least two light sensors on the light receiving end surface include related position, the related position enables the at least two light sensors situated on one end angle of two end sides of the light receiving end surface.

The predetermined time range of high sunlight illumination includes noon and time just before noon and after noon, the predetermined time range of low sunlight illumination includes morning and afternoon.

The electric potential difference is difference between a low electric potential signal and a high electric potential signal, an end portion of the light receiving end surface associated with the low electric potential signal is swung up with the solar panel, and an end portion of the light receiving end surface associated with the high electric potential signal is swung down with the solar panel.

The present invention also provides a device for automatic inclination compensation of solar sunlight tracing panel, comprising: a plurality of solar panels installed adjacent to each other; a driving unit configured to drive solar panels to swing towards sun; at least two light sensors, having related position, separately installed in a light receiving end surface, configured to be illuminated by sunlight and to generate matching electric potential signal; and a controlling unit, electrically connected between the light sensors and the driving unit, configured to compare matching electric potential signal and when the electric potential signals have electric potential, to drive the solar panels synchronically until the electric potential of the electric potential signals become equal in order for compensating the solar panel inclination to let the whole light receiving end surface illuminated by sunlight.

The light receiving end surface includes light receiving surface of the panel or a particular position, adjacent and parallel to the light receiving surface, capable of swinging with the panel.

The solar panels are installed adjacent to each other horizontally or in an inclination.

At least two light sensors are respectively situated on two adjacent sides of one end of a swinging axis of the solar panel.

At least two light sensors are respectively situated on two end sides of the light receiving end surface.

At least two light sensors are respectively situated on one end angle of two end sides of the light receiving end surface.

The electric potential difference is difference between a low electric potential signal and a high electric potential signal, an end portion of the light receiving end surface associated with the low electric potential signal is swung up with the solar panel, and an end portion of the light receiving end surface associated with the high electric potential signal is swung down with the solar panel.

Compared to the technology mentioned above, the present invention may compensate the inclination of solar panel in order for the whole light receiving end surface illuminated by sunlight.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Hereinafter, the present invention will be described in detail with reference to the accompanying drawings. It should be understood that drawings do not limit the scope of the present invention.

Figure 1:
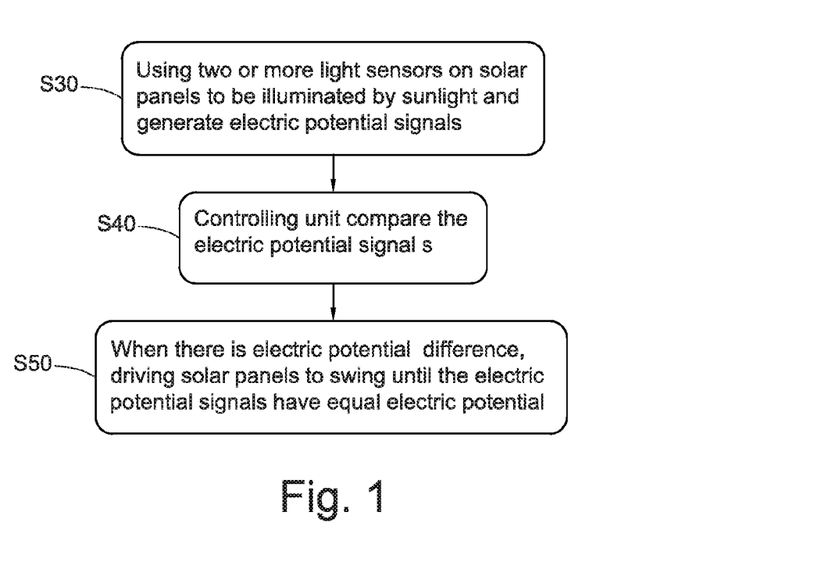
FIG. 1 is a flow chart of the present invention.
Figure 2:
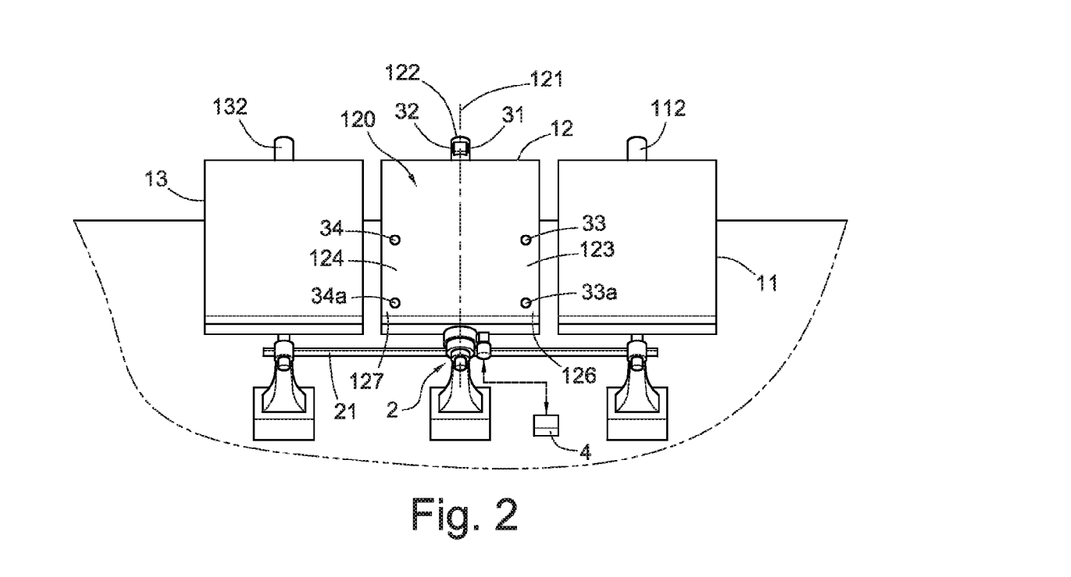
FIG. 2 is one schematic illustration of installation of the present invention.
Figure 3:
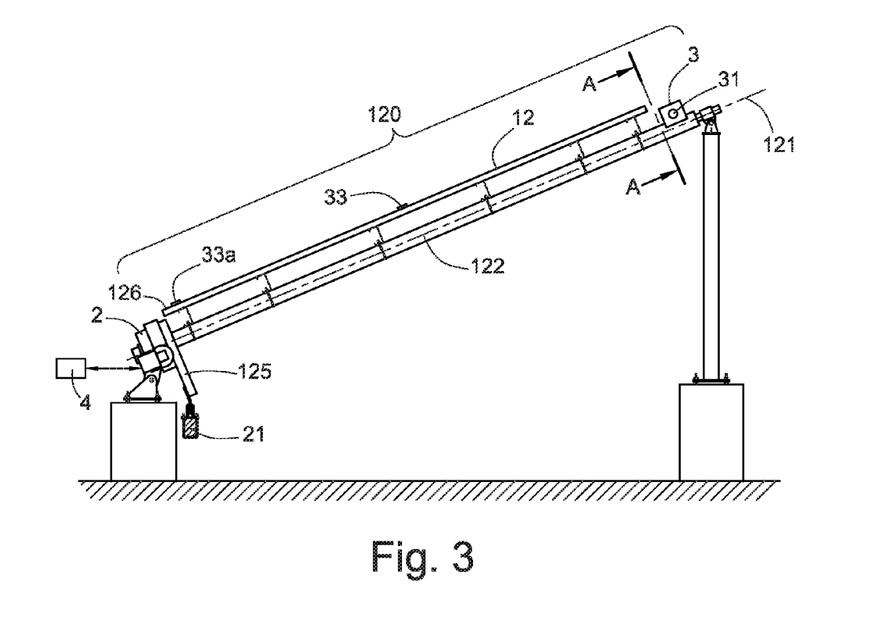
FIG. 3 is lateral view of FIG. 2.
Figure 5:
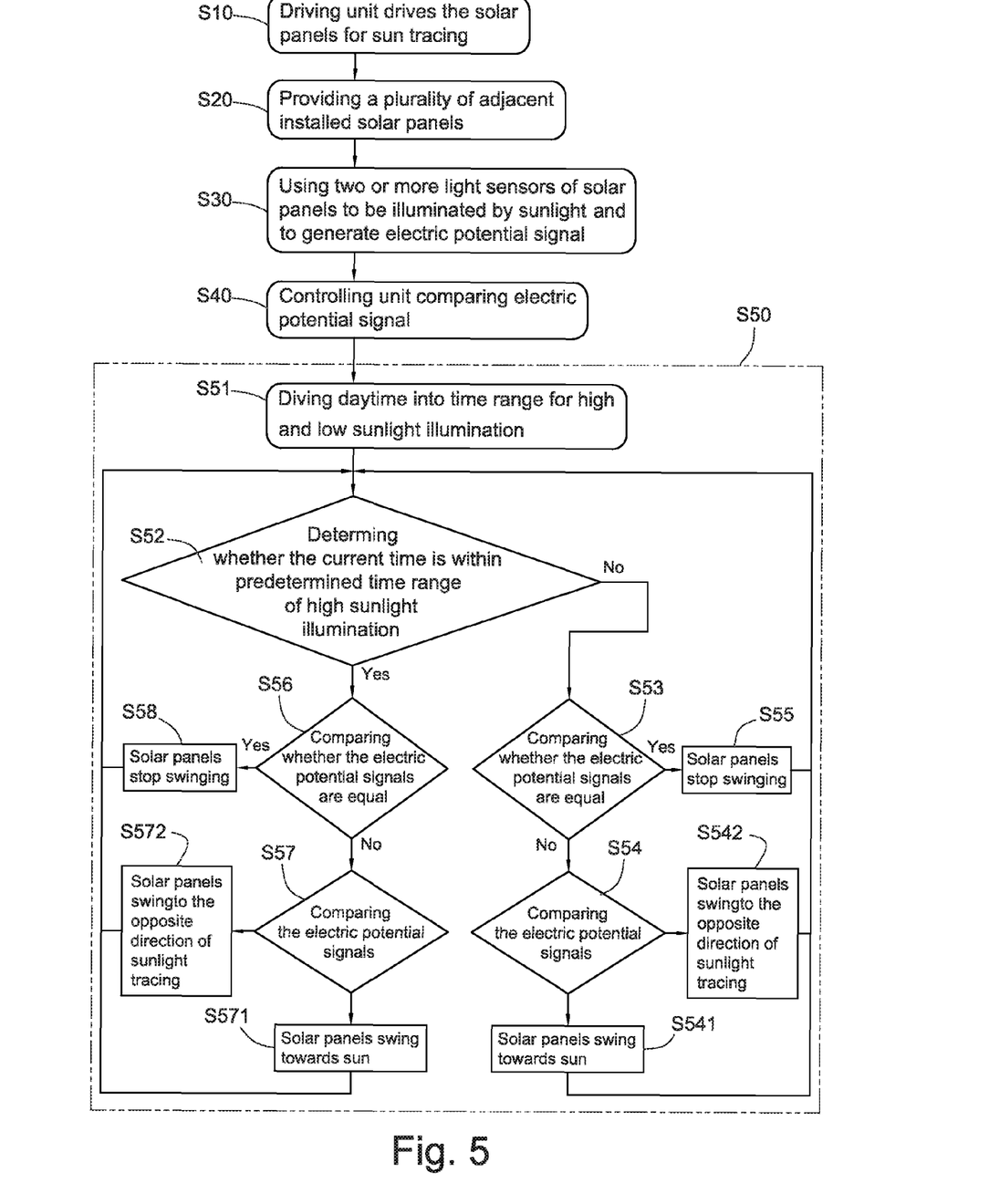
FIG. 5 is a flow chart for applying the steps of the present invention.

Please refer to FIG. 1 which discloses the flow chart of method for automatic compensation of sunlight tracing solar panel inclination of the present invention, FIG. 2, FIG. 3 and FIG. 5. The present invention includes a plurality of solar panels which is installed adjacent to each other and is capable of swinging towards sun. The invention includes a first panel 11, a second panel 12 and a third panel 13, capable of swinging in the east and west direction of the earth towards sun. First panel 11 is located on east side of the second panel 12. The third panel 13 is located on west side of the second panel 12. The method includes steps below.

Figure 6:
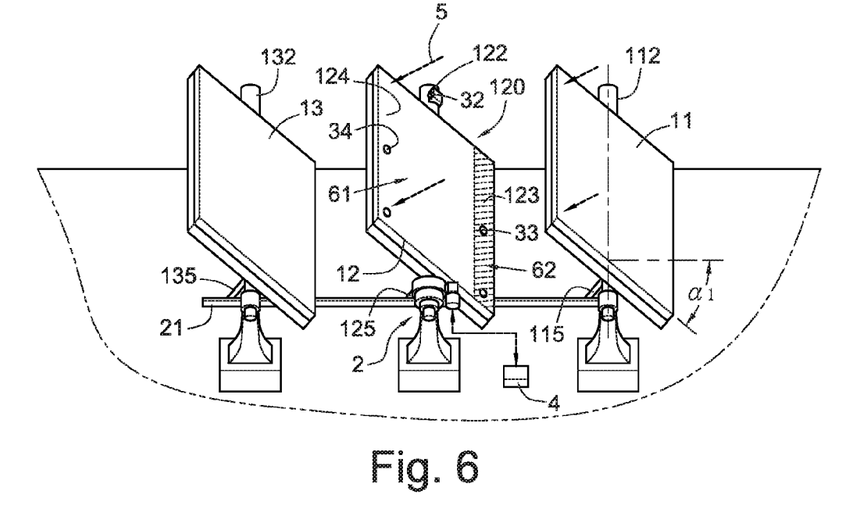
FIG. 6 shows an usage state of FIG. 2.

In step S30, two or more light sensors 31,32,33,34, located on one light receiving end surface 120 of the second panel 12, are used to be illuminated by the sunlight and generate matching electric potential signal (shown in FIG. 6).

In step S40, comparing the matching electric potential signal.

Figure 7:
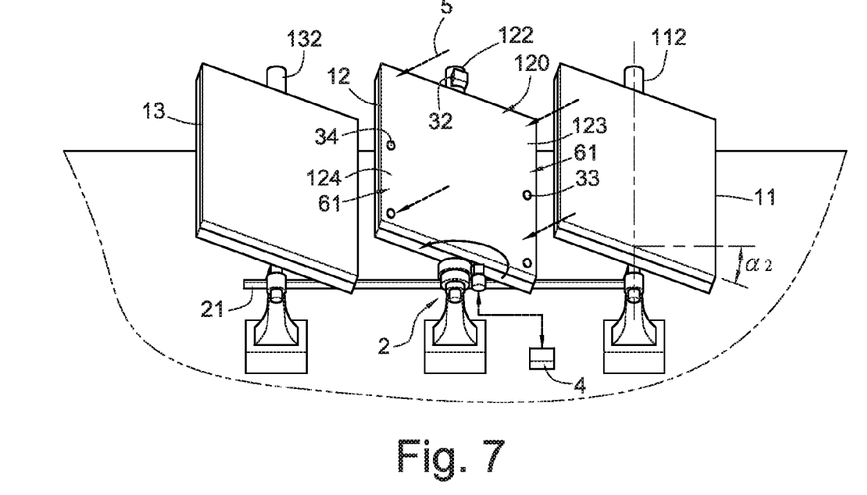
FIG. 7 shows another state of FIG. 6.

In step S50, when electric potential signals have potential difference, driving first panel 11, second panel 12 and third panel 13 to synchronously swing until the electric potential of electric potential signals become equal (as shown in FIG. 7).

As a result, the inclination of first panel 11, second panel 12 and third panel 13 are compensated. The whole light receiving end surface 120 is illuminated by the sunlight to fully accept the thermal energy.

According to the method mentioned above, the method for automatic compensation of the sunlight tracing solar panel inclination in a single day includes steps below.

In step S10, providing first panel 11, second panel 12 and third panel 13 which are installed adjacent to each other.

In step S20, a driving unit 2 is used to drive first panel 11, second panel 12 and third panel 13 to synchronically swing towards sun. The direction for tracing the sunlight is east and west direction of the earth. First panel 11, second panel 12 and third panel 13 can be synchronically moved by the linking rod 21 of the driving unit 2.

Figure 8:
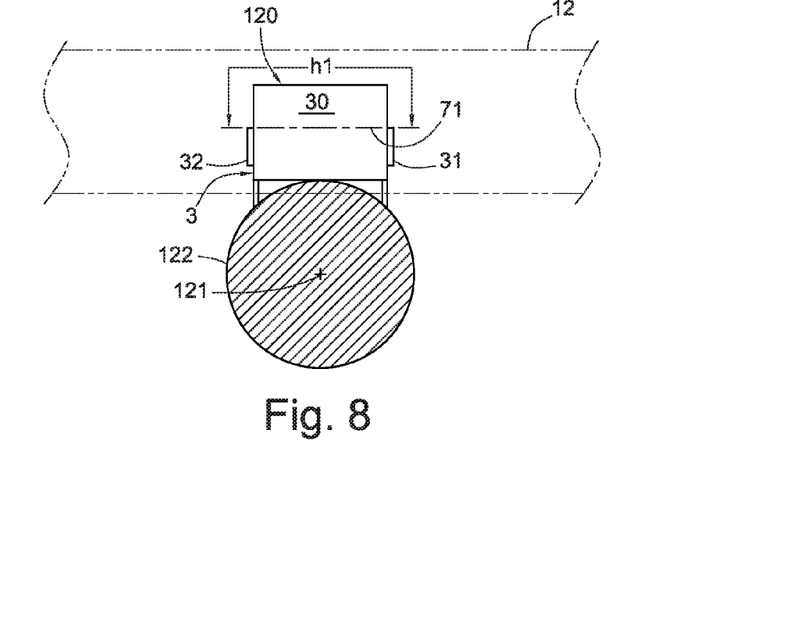
FIG. 8 is an A-A cross-sectional view of FIG. 3.
Figure 9:
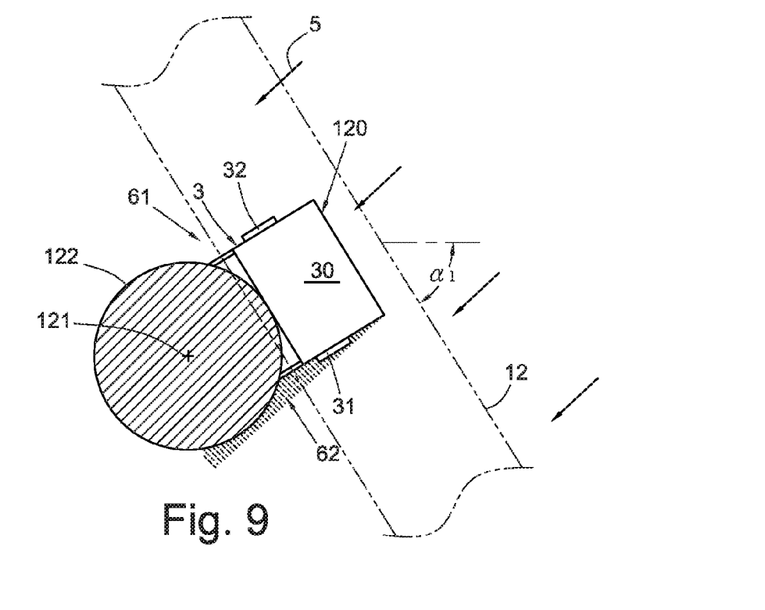
FIG. 9 shows another usage state of FIG. 8.
Figure 10:
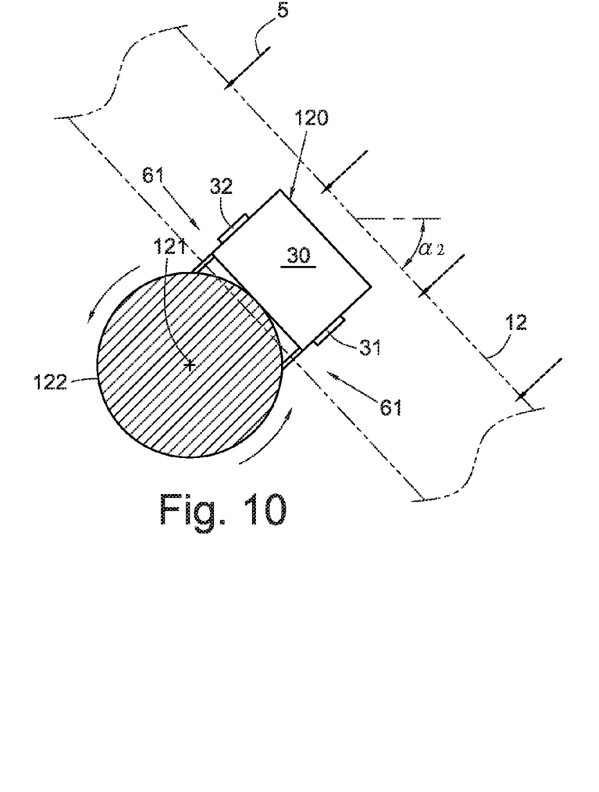
FIG. 10 shows another state of FIG. 9.
Figure 19:
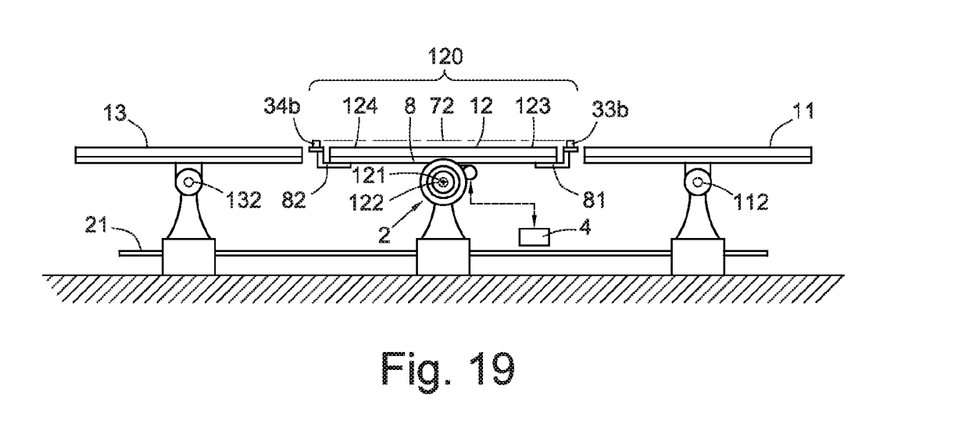
FIG. 19 is another schematic illustration of installation of the present invention.

In step S30, two or more light sensors 31, 32, 33 and 34 are separately installed on the light receiving end surface 120 of the second panel 12. The light sensors 31, 32, 33 and 34 are used to be illuminated by the sunlight and generate matching electric potential signal. The light sensors include a first light sensor 31, a second light sensor 32, a third light sensor 33 and a fourth light sensor 34, all of which have related position. First, second, third and fourth light sensors 31, 32, 33, 34 are capable of generating low and high electric potential signals according to the different illumination intensity of the sunlight. The related position makes first and second light sensors 31, 32 situated on two sides of one end of the swing axis 121 of second panel 12 (shown in FIG. 8). Actually, first, second and third panels 11, 12, 13 respectively include shafts 112,122, 132 which are pivotally installed in the direction of south and north axis of the earth. Those shafts can be synchronically driven by the driving unit 2. As a result, first, second and third panels 11,12, 13 swing in the east and west direction of the earth. The light receiving end surface 120 includes the light receiving surface which is the top surface of the second panel 12, or the particular position which is parallel to the light receiving surface and can be swung with second panel 12. The particular position can actually include tow side walls of shaft 122 of second panel 12. The axis 121 of the light receiving end surface 120 can be the axis of shaft 122. Therefore, the first light sensor 31 can be positioned on the east wall of shaft 122. The second light sensor 32 can be positioned on the west wall of shaft 122 and at the same height as first light sensor 31. As a result, first and second light sensors 31, 32 form a plane adjacent and parallel to the top surface of the second panel 12. First and second light sensors 31, 32 are capable of swinging towards sun with the second panel 12 via shaft 122 to have sunlight tracing and compensation swing (as shown in FIG. 9 and FIG. 10). The related position also makes third and fourth light sensors 33, 34 located at two end sides of light receiving end surface 120. Third light sensor 33 is located on the east end side of light receiving end surface 120. Fourth light sensor 34 is located on the west end side of light receiving end surface 120; Or, third and fourth light sensors 33a, 34a may also be located at an end angle 126, 127 of two end sides of light receiving end surface 120. Third light sensor 33a is located at end angle 126 of the east end side of light receiving surface end 120. Fourth light sensor 34a is located at end angle 127 of the west end side of light receiving end surface 120. In another embodiment, the particular position may also include brackets 81, 82 respectively extending parallel from two end sides of second panel 12 (as shown in FIG. 19). Second panel 12 can essentially be supported by a rack 8 and can be positioned at top of the shaft 122. The brackets 81, 82 can respectively extend parallel from two end sides of rack 8 to first and third panel 11, 13. Third light sensor 33b can be positioned at the top of east side bracket 81 of rack 8. Fourth light sensor 34b can be positioned at the top of the west side bracket 82 of the rack 8. A plane 72 formed between third and fourth light sensors 33b, 34b is adjacent and parallel to the top surface of second panel 12. Third and fourth light sensors 33b and 34b can make sunlight tracing and compensation swing with the second panel 12 via rack 8 and shaft 122.

In step S40, using a controlling unit 4 to continuously compare the matching electric potential signals. Wherein, In step S51, controlling unit 4 can divide daylight area to a predetermined time range for high sunlight illumination and multipliable predetermined time range for low sunlight illumination. The predetermined time range for high illumination is when the illumination intensity of sunlight is high in a single day. For example, it is at noon and it is just before or after noon. The predetermined time range for low illumination is when the illumination intensity of sunlight is low in a single day. For example, it includes morning and afternoon. Noon can be 12 p.m. Greenwich Mean Time (GMT) in the geographic position where the solar panel is installed. Time just before or after noon can be time between 10 a.m. and 3 p.m. The predetermined time range for low sunlight illumination can be time except noon and just before or after noon. This range can be different because of the season. For example, at the location near tropic cancer and in summer, the predetermined time range for low sunlight illumination can be from 5 a.m. to 10 a.m. and from 3 p.m. to 7 p.m. Users can determine the time range according to their own situation and the present invention is not limited to the above embodiments.

In step S52, the controlling unit 4 is used to continuously determine whether the current time is within the predetermined time range of high sunlight illumination.

When the current time is between 5 a.m. and 10 a.m., sun rises from the east of the earth surface and is located in the east sky of first, second and third panels 11, 12, 13. At that time, controlling unit 4, according to the predetermined angle for sunlight tracing, makes driving unit 2 to drive first, second, and third panels 11, 12, 13 to swing towards the sun (as shown in FIG. 6). As a result, the top surfaces of panels 11, 12, 13 respectively generate a predetermined angle α1 between the plane and themselves for sunlight tracing. The predetermined angle for sunlight tracing can be determined by the angle of the sun according to the season and the time. If first panel 11 prevents sunlight 5 from illuminating second panel 12, it is easier to generate a shadow area 62 on some portion of light receiving end surface 129 of second panel 12. At the same time, controlling unit 4 determines the current time is not within the predetermined time rage for high sunlight illumination and therefore, the current time is within the predetermined time rage for low sunlight illumination.

In step S53, when the current time is not within the predetermined time for high sunlight illumination, controlling unit 4 is used to compare whether the electric potential signals of first light sensor 31 and second light sensor 32 are equal.

When the current time is between 5 a.m. and 10 a.m., the west side of shaft 122 can be illuminated by sunlight 5 to generate a bright area 61 (as shown in FIG. 9). As a result, second light sensor 32 is illuminated by sunlight 5 in the bright area 61 to generate a high electric potential signal. Because first and second light sensors have a surface distance h1 (as shown in FIG. 8) in between, the surface distance h1 can actually include the diameter of shaft 122 and the surface width of a light sensor body 3 for attaching first and second light sensors 31,32. A protruding portion 30 formed by the surface distance h1 may easily prevent the sunlight 5 from illuminating the east or west side of shaft 122. At that time, if protruding portion 30 prevents the sunlight 5 from illuminating the east side of shaft 122 and generates a shadow area 62, first light sensor 31 in the shadow area 62 cannot be illuminated by the sunlight 5 and generates a low electric potential signal. As a result, the electric potential signals of first and second light sensors 31, 32 cannot be equal and the electric potential difference is generated.

In step S54, when the matching electric potential signals have electric potential difference, controlling unit 4 is used to compare the electric potential signals of first light sensor 31 and second light sensor 32.

When the current time is between 5 a.m. and 10 a.m., second light sensor 32 generates high electric potential signal which is higher than the low electric potential signal of first light sensor 31.

In step S541, controlling unit 4 makes driving unit 4 to drive one side end of light receiving end surface 120, associated with the light sensor which generates the low electric potential signal, to swing up with the second panel 12. Controlling unit 4 also makes driving unit 4 to drive the other side end of light receiving end surface 120, associated with the light sensor which generates the high electric potential signal, to swing down with the second panel 12.

When the current time is between 5 a.m. and 10 a.m. and the electric potential signal of second light sensor 32 is higher than that of first light sensor 31, driving unit 2 may drive east side end 123 of light receiving end surface 120, associated with first light sensor 31, to swing up with second panel 12 (as shown in FIG. 7 and FIG. 10). The driving unit 2 may also drive the west side end 124 of light receiving end surface 120, associated with second light sensor 32, to swing down with second panel 12. As a result, second panel 12 is swung towards the sunlight synchronously with the first panel 11 and the third panel 13. During this period, steps S52, S53, S54 and S541 are repeated. When step S53 is repeated and second panel 12 swings towards sun until the east and west side of shaft 122 are both illuminated by sunlight 5, shaft 122 forms a bright area 61 in its east and west surface. As a result, first and second light sensors 31, 32 can simultaneously be illuminated by sunlight 5, resulting in equal electric potential signals.

In step S55, when the current time is between 5 a.m. and 10 a.m. and the electric potential of the electric potential signals are equal, controlling unit 4 makes driving unit 2 to stop driving shaft 122 and first, second and third panels 11, 12, 13 stop swinging. As a result, an angle α2 is respectively formed between each top surface of panels 11, 12,13 and the plane (as shown in FIG. 7 and FIG. 10). The subtraction value of α1 is α2 is the compensation value of inclination for sunlight tracing panels 11, 12, 13. Therefore, shadow area 62 of light receiving end surface 120 can be eliminated. The whole light receiving end surface 120 can be illuminated by the sunlight. The sensitivity of compensation swing of solar panels can be increased. During this period, steps S52, S53 and S55 are repeated. When step S53 is repeated and the electric potential signal has electric potential difference, steps S52, S53, S54 and S541 are repeated.

Figure 11:
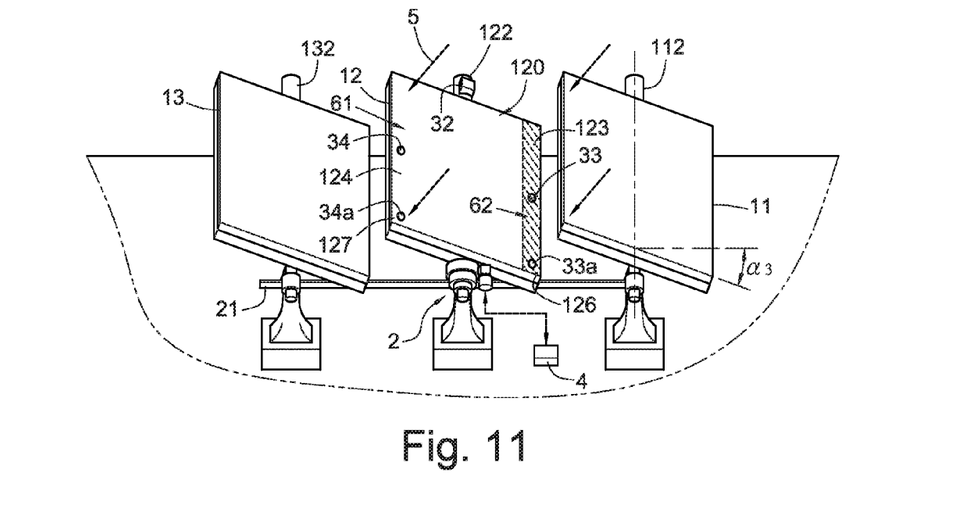
FIG. 11 shows another usage state of FIG. 2.

When step S52 is repeated and the current time is between 10 a.m. and 12 p.m., sun gradually moves above first, second and third panels 11, 12, 13 or above the east sky, controlling unit 4 makes driving unit 2 to drive first, second and third panels 11, 12, 13 according to the predetermined angle for sunlight tracing (as shown in FIG. 11). A predetermined angle α3 is respectively formed between each top surface of first, second, third panels 11, 12, 13 and the plane. During this period, if first panel 11 prevents sunlight 5 from illuminating second panel 12, it is easy for a portion of light receiving end surface 120 of second panel 12 to form a shadow area 62. Simultaneously, controlling unit 4 determines whether the current time is within predetermined range of high sunlight illumination.

In step S56, when the current time is within predetermined time range of high sunlight illumination, controlling unit 4 is used compare whether the electric potential signals of third and fourth light sensors 33, 33a, 34 and 34a are equal to each other.

When the current time is between 10 a.m. and 12 p.m., west side end 124 of light receiving end surface 120 is illuminated by sunlight 5 and thus generates a bright area 61. As a result, fourth light sensors 34 and 34a are illuminated by sunlight 5 and generate high electric potential signals. Simultaneously, if first panel 11 covers sunlight 5, the east side end 123 and end angle 126 of light receiving end surface 120 form a shadow area 62. As a result, third light sensors 33, 33a in the shadow area 62 are not illuminated by sunlight 5 and generate low electric potential signals. The electric potential signals of third and fourth light sensors 33, 33a, 34a, 34a are not equal to each other and generate electric potential difference.

In step S57, when the electric potential signals have potential difference, controlling unit 4 is used to compare the electric potential signals of third and fourth light sensors 33, 33a, 34, 34a. When the current time is between 10 a.m. and 12 p.m., fourth light sensor 34 generates high electric potential signal, which is higher than the low electric potential signal of third light sensor 33.

In step S571, controlling unit 4 makes driving unit 2 to drive one side end of light receiving end surface 120, associated with the light sensor which generates low electric potential signal, to swing up with the second panel 12. Controlling unit 4 also makes driving unit 2 to drive the other side end of light receiving end surface 120, associated with the light sensor which generates high electric potential signal, to swing down with the second panel 12.

Figure 12:
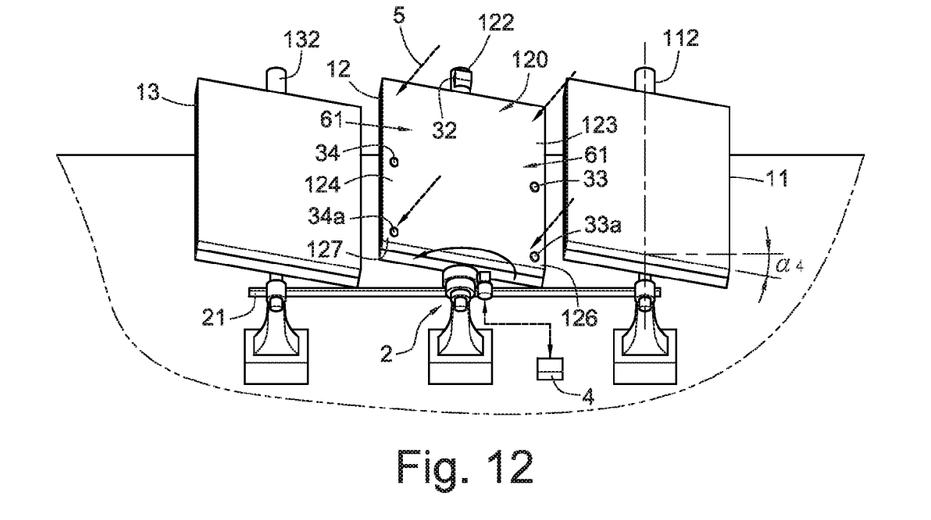
FIG. 12 shows another state of FIG. 11.

When the current time is between 10 a.m. and 12 p.m., the electric potential signals of fourth light sensors 34, 34a are higher than those of third light sensors 33, 33a. Therefore, driving unit 2 drives east side end 123 and side angle 126 of lighting receiving end surface 120, associated with third light sensors 33, 33a, to swing up with second panel 12 (as shown in FIG. 12). Driving unit 2 also drives west side end 124 and end angle 127 of lighting receiving end surface 120, associated with fourth light sensors 34, 34a, to swing down with second panel 12. As a result, second panel 12 swings towards the direction of sun together with first and third panel 11, 13.

During the period, steps S52, S56, S57 and S571 are repeated. When step S56 is repeated and east and west side ends 123, 124 and side angles 126, 127 of light receiving end surface 120 are all illuminate by sunlight 5, east and west side ends 123, 124 and end angles 126, 127 of light receiving end surface 120 all form a bright area 61. As a result, third and fourth light sensors 33, 33a, 34 and 34a are illuminated simultaneously by sunlight 5 and generate equal electric potential signals.

In step S58, when the electric potential of electric potential signals are equal, controlling unit 4 makes driving unit 2 to stop driving shaft 122. First, second and third panels 11, 12, 13 stop swinging. An actual angle α4 (shown in FIG. 12) is formed respectively between each top surface of panels 11, 12, 13 and the plane. As a result, shadow area 62 of light receiving end 120 is eliminated and the whole area of light receiving end 120 is illuminated by sunlight. During the period, steps S52, S56 and S58 are repeated. When step S56 is repeated and the electric potential signals have potential difference, S52, S56, S57 and S571 may be repeated.

Figure 13:
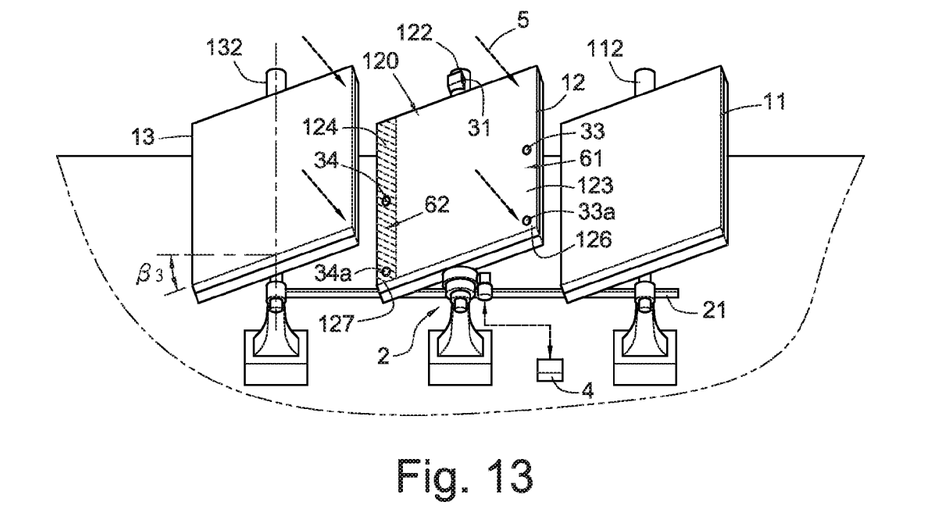
FIG. 13 shows another usage state of FIG. 2.

When step S57 is repeated and the current time is between 12 p.m. and 3 p.m., sun gradually moves above first, second and third panels 11, 12, 13 or above the west sky, controlling unit 4 makes driving unit 2 to drive first, second and third panels 11, 12, 13 towards sun (as shown in FIG. 13) according to the predetermined angle for sunlight tracing. A predetermined angle β3 is respectively formed between each top surface of first, second, third panels 11, 12, 13 and the plane. During this period, east side end 123 and end angle 126 of light receiving end surface 120 are illuminated by sunlight 5 and form a bright area 61. As a result, third light sensors 33, 33a are illuminated by sunlight 5 in the bright area and generate a high electric potential. Simultaneously, if third panel 13 prevents sunlight 5 from illuminating second panel 12, west side end 124 and end angle 127 of light receiving end surface 120 form a shadow area 62. Fourth light sensors 34, 34a cannot be illuminated by sunlight 5 and generate a low electric potential signal. As a result, the electric potential signals of third light sensors 33, 33a are higher than those of fourth sensors 34, 34a.

In step S572, controlling unit 4 makes driving unit 2 to drive one side end of light receiving end surface 120, associated with low electric potential signal, to swing up with second panel 12. Controlling unit 4 also makes driving unit 2 to drive another side end of light receiving end surface 120, associated with high electric potential signal, to swing down with second panel 12.

Figure 14:
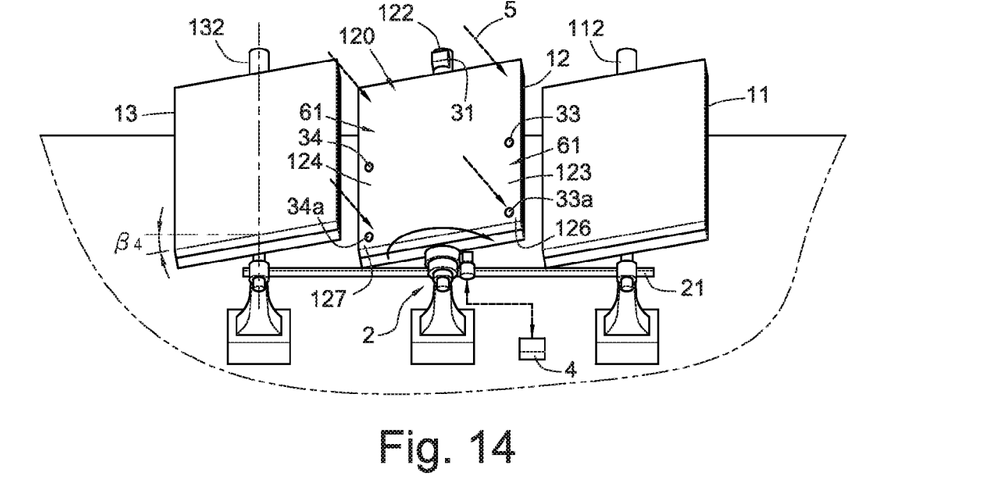
FIG. 14 shows another state of FIG. 13.

When the current time is within 12 p.m. and 3 p.m. and electric potential signals of third light sensors 33, 33a are higher than those of fourth light sensors 34, 34a, driving unit 2 drives west side end 124 and end angle 127 of light receiving light end surface 120, associated with fourth light sensors 34, 34a, to swing up with second panel 12 (as shown in FIG. 14). Driving unit 2 also drives east side end 123 and end angle 126 of light receiving end surface 120, associated with third light sensors 33, 33a, to swing down with second panel 12. As a result, second panel 12 swing opposite to the sunlight tracing direction together with first panel 11 and third panel 13. During the period, steps S52, S56, S57 and S572 are repeated. When step S56 is repeated and second panel 12 swings opposite to the sunlight tracing direction until third and fourth light sensors 33, 33a, 34, 34a generate equal electric potential signals, S52, S56 and S58 may be repeated. An actual angle β4 (as shown in FIG. 14) is formed between each top surface of panels 11, 12, 13 and the plane for sunlight tracing. When step S56 is repeated and electric potential signals have electric potential difference, steps S52, S56, S57 and S572 are repeated.

When step S52 is repeated and the current time is between 10 a.m. and 12 p.m., the sun gradually moves to the west sky of first, second and third panels 11, 12, 13, controlling unit 4 makes driving unit 2 to drive first, second and third panels 11, 12, 13 according to the predetermined angle for sunlight tracing (as shown in FIG. 11). A predetermined angle α3 is formed between each top surface of first, second, third panels 11, 12, 13 and the plane. During this period, if first panel 11 prevents sunlight 5 from second panel 12, it is easy for a portion of light receiving end surface 120 of second panel 12 to form a shadow area 62. Simultaneously, controlling unit 4 determines whether the current time is within predetermined range of high sunlight illumination. Therefore, step S53 are repeated.

Figure 15:
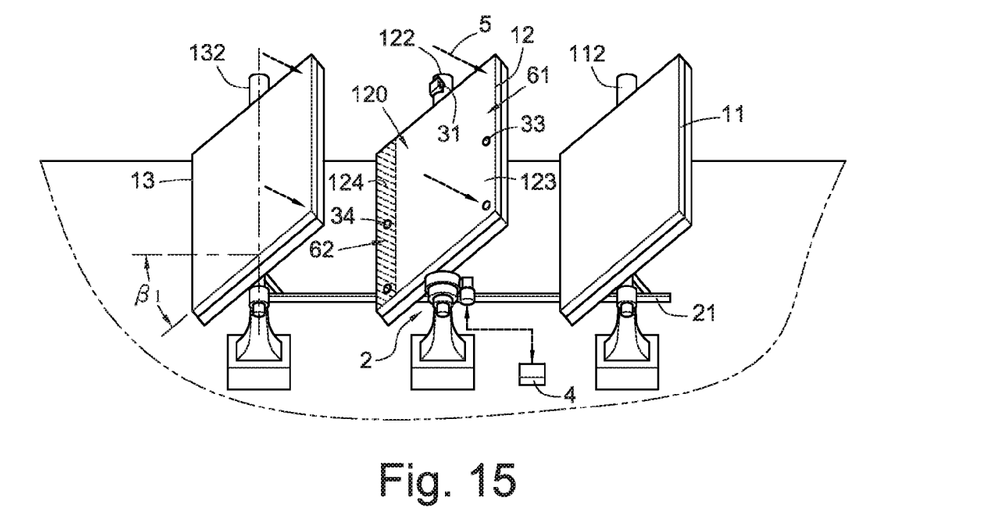
FIG. 15 shows another usage state of FIG. 2.
Figure 17:
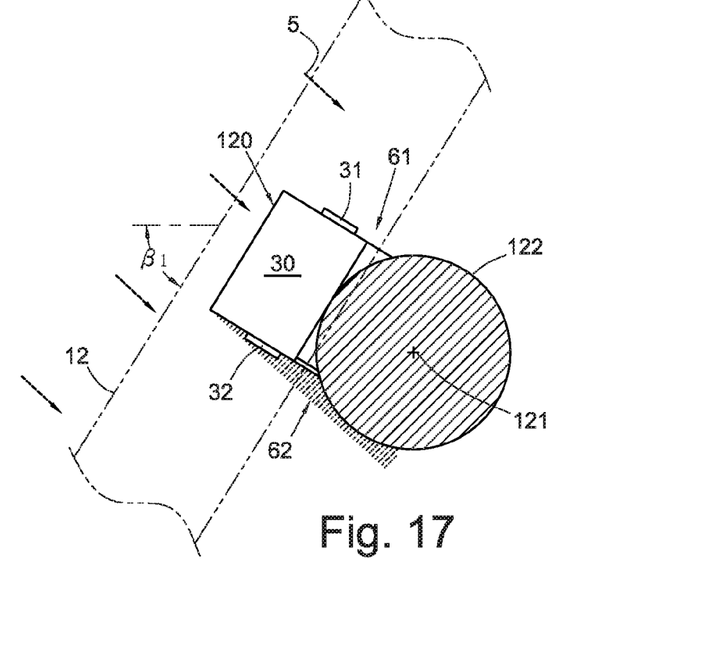
FIG. 17 shows another usage state of FIG. 8.

In step S53, when the present current is between 3 p.m. and 7 p.m., the east side of shaft 122 can be illuminated by sunlight 5 and generates a bright area 61 (as shown in FIG. 15 and FIG. 17). First light sensor 31, as a result, is illuminated by sunlight 5 in the bright area 61 and generates a high electric potential signal. At the meantime, if protruding portion 30 prevents sunlight 5 from illuminating on the west side of shaft 122, a shadow area 62 may be formed. As a result, second light sensor 32 in the shadow area 62 is not illuminated by sunlight 5 and generates a low electric potential signal, which causes the electric potential difference between first light sensor 31 and second light sensor 32. Therefore, step S54 is repeated.

In step S54, controlling unit 4 is used to compare the electric potential signals of first and second light sensors 31, 32. When the current time is between 3 p.m. and 7 p.m., first light sensor 31 generates high electric potential signal, higher than low electric potential signal of second light sensor 32.

In step S542, controlling unit 4 makes driving unit 2 to drive one side end of light receiving end surface 120, associated with light sensor which generates the low electric potential signal, to swing up with second panel 12. The controlling unit 4 also makes driving unit 2 to drive another side end of light receiving end surface 120, associated with light sensor which generates the high electric potential signal, to swing down with second panel 12.

Figure 16:
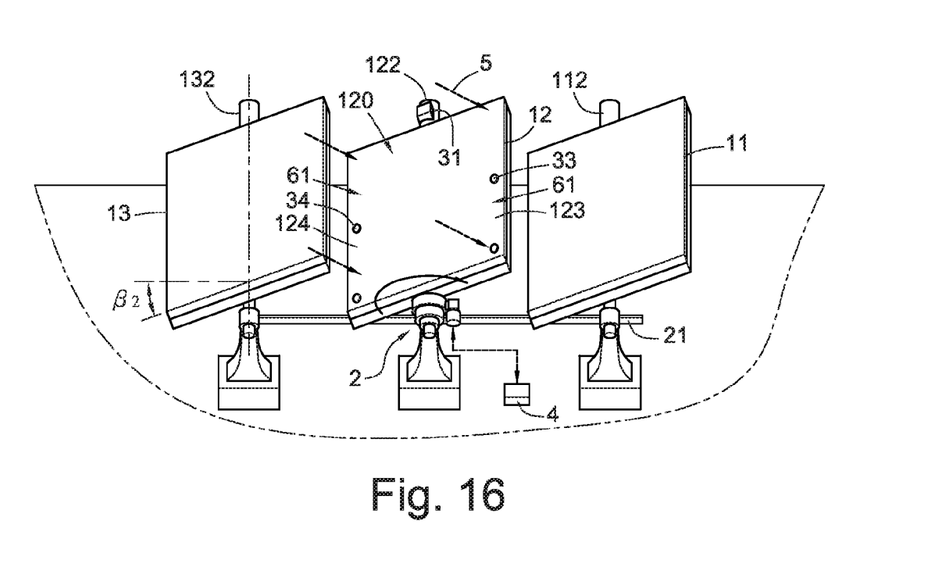
FIG. 16 shows another state of FIG. 13.
Figure 18:
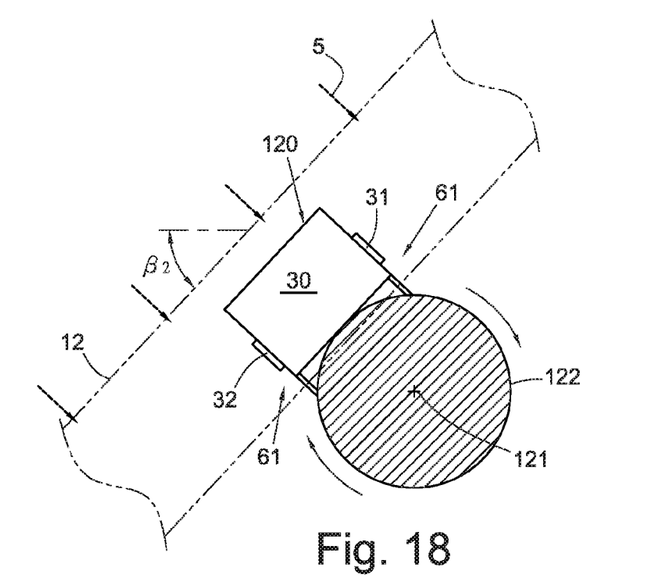
FIG. 18 shows another state of FIG. 17.

When the current time is within 3 p.m. and 7 p.m. and the electric potential signal of first light sensor 31 is higher than that of second light sensor 32, driving unit 2 drives west side end 124 of the light receiving end surface 120, associated with second light sensor 32, to swing up with second panel 12 (as shown in FIG. 16 and FIG. 18). The controlling unit 4 also makes driving unit 2 to drive east side end 123 of light receiving end surface 120, associated with first light sensor, to swing down with second panel 12. As a result, second panel 12, together with first panel 11 and third panel 13, swing in the opposite direction of tracing sun. During the period, steps S52, S53, S54 and S542 are repeated. When step S53 is repeated and first light sensor 31 and second light sensor 32 generate equal electric potential signals, steps S52, S53 and S55 are repeated. As a result, an actual angle β2 for sunlight tracing is formed between each top surface of panel 11, 12, 13 and the plane. When S53 is repeated and the electric potential signals have potential difference, S52, S53, S54 and S642 are repeated.

As mentioned above, light sensors 31, 32, 33, 33a, 34, 34a continuously detect and generate matching electric potential signal. Controlling unit 4 compares the electric potential signals to determine when the driving unit 2 needs to be used to drive the solar panel for compensation swing. As a result, solar panels are capable of real-time swing compensation of inclination in order for the whole light receiving end surface 120 to be illuminated by sunlight. The shadow area 62 of light receiving end surface 120 of adjacent solar panel, which is formed when the solar panel covers the sunlight, is eliminated. Therefore, the issue that solar panels temporarily stop generating the electricity is solved and the electricity generating efficiency of solar panels is increased.

In addition, the present invention can be applied within the predetermined time range of low sunlight illumination. Controlling unit 4 is used compare the electric potential signals of third and fourth light sensors 33, 33a, 34 and 34a. When there is electric potential difference between the electric potential signals, first, second, third panels 11, 12, 13 are driven synchronously to swing until the electric potential of electric potential signals become equal to each other. At the same time, the present invention can also be applied in the predetermined range of high sunlight illumination. Controlling unit 4 is used to compare the electric potential signal of first and second light sensors. When there is electric potential difference between electric potential signals, first, second and third panels 11, 12,13 are driven synchronically to swing until the electric potentials of the electric potential signals become equal.

Figure 4:
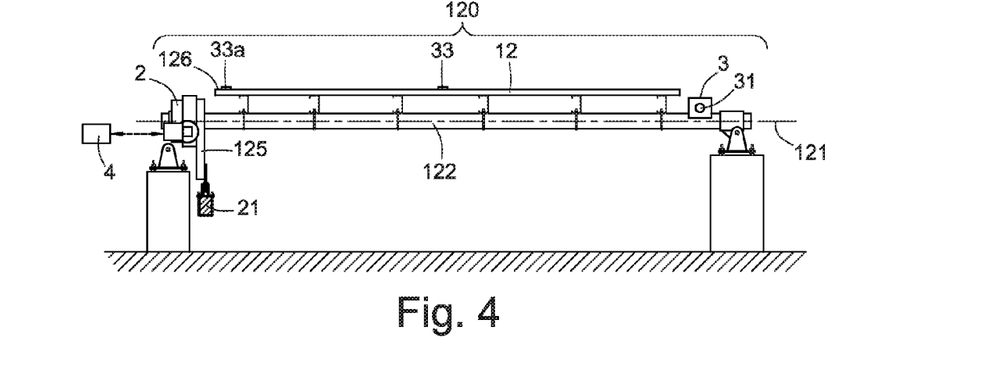
FIG. 4 is another schematic illustration of installation of the present invention.

Please refer to FIG. 2, disclosing a schematic illustration of installation of device for automatic inclination compensation of sunlight tracing solar panel, and also refer to FIG. 3. The present invention includes a plurality of solar panels adjacent to each other, a controlling unit 2, two or more light sensors 31, 32, 33, 34 which have relative position to each other and a controlling unit 4. The solar panels include first panel 11, second panel 12 and third panel 13, all of which are capable of swinging in the direction of east and west of the earth to the sunlight tracing angle. First panel 11 is located on the east side of second panel 12. Third panel 13 is located on the west side of second panel 12. First, second, third panels 11, 12, 13 respectively include shafts 112, 122, 132, all of which are pivotally installed in the direction of south axis and north axis. Shafts 112, 122, 132 respectively install pendulum rods 115, 125, 135 extending down (as shown in FIG. 3 and FIG. 6). The bottom ends of pendulum rods 115, 125, 135 are all pivotally connected to a linking rod 21. In addition, first panel 11, second panel 12 and third panel 13 can be installed horizontally or in an inclination (as shown in FIG. 4).

Driving unit 2 may be installed adjacent to one end of shaft 122 of second panel 12 (as shown in FIG. 2 and FIG. 3). Driving unit 2 includes a motor, a worm capable of being driven by the motor and a turbine engaged with the worm. One end of shaft 122 is connected with the turbine. The motor drives the worm, and thus drives the turbine and shaft 122 of second panel 12. As a result, pendulum rod 115 of second panel 12 is swung, and thus affects linking rod 21 and pendulum rods 125, 135 to synchronically drive first, second and third panel 11,12,13 to swing towards the sun tracing direction (as shown in FIG. 6 and FIG. 13).

Light sensors include first light sensor 31, second light sensor 32, third light sensor 33 and fourth light sensor 34, all of which are separately installed on light receiving end surface 120 of second panel 12 (as shown in FIG. 2 and FIG. 3) and are illuminated by sunlight to generate matching electric potential signal. First, second, third and fourth light sensors 31, 32, 33, 34 can respectively generate low and high electric potential signals according to the illumination difference of sunlight. Light receiving end surface 120 includes a light receiving surface on the top surface of second panel 12 or particular position which is capable of swinging with second panel 12 and is parallel to the light receiving surface. The particular position can actually include two side walls of shaft 122 of second panel 12. The relative position enables first and second light sensors 31, 32 to be situated on two adjacent sides of swing axis 121 of second panel 12 (as shown in FIG. 8). In the present embodiment, first light sensor 31 is located on the eastern side of axis 121. Actually, axis 121 of light receiving end surface 120 can be axis of shaft 122. Shaft 122 includes a light sensor body 3. As a result, first light sensor 31 is located to east wall of light sensor body 3. Second light sensor 32 may be located to east wall of light sensor body 3 at the same height as first light sensor 31. As a result, a plane formed between first light sensor 31 and second light sensor 32 is adjacent and parallel to the top of second panel 12. The first and second light sensors 31, 32 are capable of making sun tracing swing and compensation swing with second panel 12 via shaft 122. (as shown in FIG. 9 and FIG. 10)

The relative position enables third light sensor 33 and fourth light sensor 34 situated on two end sides of light receiving end surface 120 (as shown in FIG. 2 and FIG. 3). Third light sensor 33 and fourth light sensor 34 are located on the east end side of light receiving end surface 120. In the present embodiment, third and fourth light sensors 33, 34 may be separately installed on the top surface of second panel 12 and on two sides of shaft 122. Third light sensor 33 is located at the east side end 123 of light receiving end surface 120 of second panel 12. Fourth light sensor 34 is located at the west side end 124 of light receiving end surface 120. Or, third and fourth light sensor 33a, 34a can also be installed at the end angle 126, 127 of two end sides of light receiving end 120. Third light sensor 33a is located at end angle 126 of east side of light receiving end 120. Fourth light sensor 34a is located at end angle 127 of west side of light receiving end 120.

Controlling unit 4 is installed close to driving unit 2 and is electrically connected between first, second, third and fourth light sensors 31, 32, 33, 33a, 34, 34a and driving unit 2. As a result, controlling unit 4 is capable of comparing matching electric potential signal and making driving unit 2 to drive first, second, third panel 11, 12, 13 to synchronically swing until the electric potentials of electric signals become equal (as shown in FIG. 7 and FIG. 10).

Furthermore, in another embodiment, the particular position mentioned above can also include brackets 81, 82 parallel extending out from both end sides of second panel 12 (as shown in FIG. 19). Second panel 12 may essentially be held by a rack 8 for being positioned at the top surface of shaft 122. Brackets 81, 82 can respectively parallel extend from both end sides of rack 8 to first and third panels 11, 13. Third light sensor 33b can be positioned at the top of bracket 81 which is on the east side of racket 8. Fourth light sensor 34b can be positioned at the top of bracket 82 which is on the west side of racket 8. As a result, a plane 72 formed between third and fourth light sensors 33b, 34b is adjacent to and parallel to the top of second panel 12. Third and fourth light sensors 33b, 34b are capable of doing sunlight tracing swing and compensation swing accompanied with second panel 12 via racket 8 and shaft 122.

Therefore, during the period when first, second and third panel 11, 12, 13 swing towards the sunlight, light sensors 31, 32, 33, 33a, 33b, 34, 34a, 34b can be respectively illuminated by sunlight in different angle and respectively generates low and high electric potential signals. Driving unit 2 drives the end of light receiving end surface 120, associated with the light sensor which generates low electric potential signal, to swing up with second pane 112. Driving unit 2 also drives the end of light receiving end surface 120, associated with the light sensor which generates high electric potential signal to swing down with second pane 112. As a result, the whole light receiving end surface 120 is illuminated by sunlight. The device mentioned above can apply the embodiments of method for automatic compensation of inclination for solar sunlight tracing panel.

Therefore, after comparing the matching electric potential signals and detecting the electric potential signals have potential difference, driving unit 2 drives solar panels to synchronically swing until the electric potentials become the same. As a result, solar panels swing to a compensation inclination to make the whole light receiving end surface 120 illuminated by sunlight.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for automatic inclination compensation of solar sunlight tracing panel, comprising the steps of:
    using at least two light sensors of a light receiving end surface of the solar panel for being illuminated by sunlight and generating matching electric potential signals; and
    comparing the matching electric potential signals and when the electric potential signals have electric potential difference, driving the solar panels synchronically until the electric potential of the electric potential signals become equal in order for compensating the solar panel inclination to let the whole light receiving end surface illuminated by sunlight.

2. The method according to claim 1, wherein light receiving end surface includes light receiving surface of the panel or a particular position, adjacent and parallel to the light receiving surface, capable of swinging with the panel.

3. The method according to claim 1, further comprising the step of dividing a daylight area into a predetermined time range for high sunlight illumination and a predetermined time range for low sunlight illumination, and comparing the electric potential signals in the time range for low sunlight illumination.

4. The method according to claim 1, further comprising the step of dividing a daylight area into a predetermined time range for high sunlight illumination and a predetermined time range for low sunlight illumination, and comparing the electric potential signals in the time range for high sunlight illumination.

5. The method according to claim 1, wherein the at least two light sensors of the light receiving end surface have related position, the related position enables the at least two light sensors situated on two adjacent sides of one end of a swinging axis of the solar panel.

6. The method according to claim 1, wherein the at least two light sensors of the light receiving end surface include related position, the related position enables the at least two light sensors situated on two end sides of the light receiving end surface.

7. The method according to claim 1, wherein the at least two light sensors on the light receiving end surface include related position, the related position enables the at least two light sensors situated on one end angle of two end sides of the light receiving end surface.

8. The method according to claim 1, wherein the electric potential difference is difference between a low electric potential signal and a high electric potential signal, an end portion of the light receiving end surface associated with the low electric potential signal is swung up with the solar panel, and an end portion of the light receiving end surface associated with the high electric potential signal is swung down with the solar panel.

9. The method according to claim 3, wherein the predetermined time range of high sunlight illumination includes noon and time just before noon and after noon, the predetermined time range of low sunlight illumination includes morning and afternoon.

\* \* \* \* \*